May 20, 1952 LA VON I. POWELL 2,597,748
CHILD'S WALKING AND RIDING VEHICLE
Filed Feb. 23, 1950
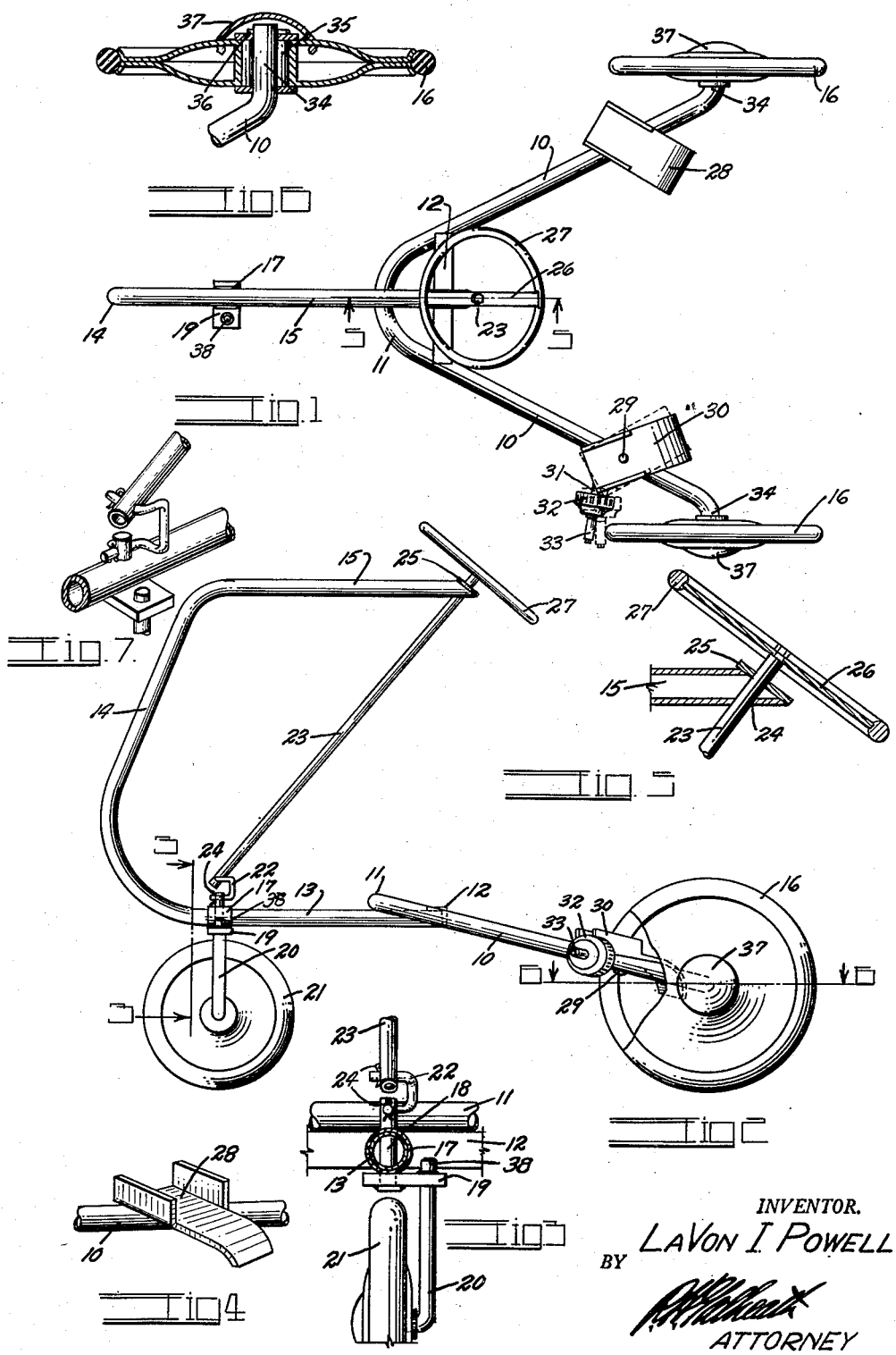
INVENTOR.
LAVON I POWELL
BY
ATTORNEY Patented May 20, 1952

2,597,748

UNITED STATES PATENT OFFICE 2,597,748

CHILD'S WALKING AND RIDING VEHICLE

La Von I. Powell, Denver, Colo.

Application February 23, 1950, Serial No. 145,772

2 Claims. (Cl. 280—87.04)

This invention relates to a child's vehicle, and has for its principal object the provision of a vehicle for a very young child which will simulate the tricycle used by the older children, but will not require the child to master the arts of pedaling or riding.

Another object of the invention is to provide a vehicle motivated by walking and pushing, which can also be used for riding or coasting.

A further object is to provide a construction for such a vehicle which will reduce the cost thereof to a minimum so as to place the vehicle within the financial reach of all families.

Other objects and advantages reside in the detail construction of the invention, which is designed for simplicity, economy, and efficiency. These will become more apparent from the following description.

In the following detailed description of the invention, reference is had to the accompanying drawing which forms a part hereof. Like numerals refer to like parts in all views of the drawing and throughout the description.

In the drawing:

Figure 1 is a plan view of the improved child's vehicle;

Fig. 2 is a side view therof;

Fig. 3 is a fragmentary, enlarged, detail section, taken on the line 3—3, Fig. 1;

Fig. 4 is a detail view illustrating a foot rest member employed on the improved vehicle;

Fig. 5 is a fragmentary, enlarged, detail section, taken on the line 5—5, Fig. 1;

Fig. 6 is a similar detail section, taken through the far wheel on the line 6—6, Fig. 2; and Fig. 7 is a fragmentary, perspective view of a flexible connection between a steering column and a wheel pivot pin as used in the improved child's vehicle.

The frame of the improved vehicle for walking children is formed from two pieces of tubing, preferably of aluminum. One piece lies substantially horizontal and is bent in a V-shape to provide two flaring leg portions 10 and a rounded head portion 11. A cross member 12, preferably an angle iron, extends between the two leg portions 10 adjacent the rounded head portion 12 and is permanently secured in place by welding its extremities to the leg portions 10.

The rearward extremities of the leg portions 10 are turned oppositely outward into alignment with each other to form axle stubs 34 for mounting a pair of rear wheels 16. The axle stubs extend through anti-friction bearings 35 in the wheels, as shown in Fig. 5, and are secured therein by means of suitable cotter keys 36. The axle extremities are covered by means of the conventional hub caps 37.

The other piece of tubing is bent in a substantially U-shape and lies in a vertical plane, with the open side of the U facing rearwardly. The U-shaped bend provides a bottom portion 13, a front portion 14, and a top portion 15. The latter portions form a rough outline simulating the outline of the hood of an autmotive vehicle.

The rear extremity of the bottom portion 13 extends beneath the head portion 11 and terminates against the cross member 12 and is welded or otherwise permanently secured to both to form a unitary structure of the two pieces of tubing. The bottom portion 13 is provided with a reinforcing sleeve 17 adjacent its forward extremity, and both the portion 13 and the sleeve are vertically drilled to rotatably receive a king pin 18.

The pin 18 is welded to, and extends vertically upward from, a steering plate 19. An L-shaped axle bracket 20 is welded in the plate 19 to one side of the pin 18 and extends downwardly from the plate to form an axle for a front wheel 21. This construction places the wheel 21 accurately below the axis of the pin 18 to balance the steering action of the wheel 21.

The upper extremity of the pin 18 is drilled horizontally in the plane of the wheel 21 to receive the lower extremity of a bent rod 22. The bent rod 22 extends first rearwardly from the pin 18, thence outwardly to a position at one side of the lower extremity of an inclined steering column 23, thence through a horizontal hole in the latter positioned at right angles to the axis of the hole in the pin 18, in which the lower extremity of the bent rod is positioned. The lower extremity of the bent rod is secured in the pin 18 and the upper extremity thereof is secured in the steering column 23 by means of suitable cotter keys 24. This provides a flexible connection between the steering column 23 and the pin 18 whereby all rotative movements of the former will be transmitted to the latter.

The rearward extremity of the upper portion 15 of the second tubular member is cut on an incline, as shown in Fig. 5, to provide a longer lower side through which a hole 24 is drilled, through which the steering column 23 passes on an incline. A washer 25 surrounds the steering column 23 above the inclined cut to close the extremity of the portion 15. The upper extremity of the steering column is welded or otherwise secured in a diametrically extending spoke plate 26 of a steering wheel rim 27, by means of which the steering column 23 may be rotated for steering purposes.

Two foot rest plates are provided, both of which may be welded or otherwise permanently secured on the leg members 10. It is preferred, however, to weld one of the plates in place to provide a fixed foot rest plate 28, and to mount the other foot rest plate on a pivot rivet 29, to provide a turnable foot rest plate 30.

A mounting arm 31 projects from the foot rest plate 30, and a miniature siren device 32 is mounted thereon. The siren device is driven from a projecting siren shaft 33 which can be swung into contact with the tire of one of the rear wheels 16 by turning the foot plate 30.

The improved vehicle is designed to be pushed by a child walking between the two flaring leg portions 10 and gripping the steering wheel rim 27. After suitable proficiency is attained, the vehicle can be used for coasting, the child standing on the two foot rest plates 28 and 30. The pleasure of coasting can be enhanced by rotating the left foot outwardly to bring the shaft 33 of the siren device 32 against the tire of the left rear wheel to rotate and sound the siren. This also serves as a brake upon the left rear wheel to control the speed, since the siren device reacts with considerable resistance against the wheel.

It is preferred to run the upper extremity of the L-shaped axle bracket above the steering plate 19, as shown at 38, to provide a stop member which will strike the side of the portion 13 to limit the side swing of the front wheel 21.

While a specific form of the improvement has been described and illustrated herein, it is to be understood that the same may be varied, within the scope of the appended claims, without departing from the spirit of the invention.

Having thus described the invention, what is claimed and desired secured by Letters Patent is:

1. A vehicle adapted to be pushed by a walking child comprising: a substantially horizontal, V-shaped rear frame member having its apex directed forwardly, and its two legs directed rearwardly; a rear wheel supporting each rear leg of said V-shaped rear frame member; a substantially vertical frame member secured at the apex of said rear frame member and extending medially forward therefrom; a steerable front wheel supporting said vertical frame member; means for steering said front wheel; a foot rest member mounted on each leg of said rear frame member, one of said foot rest members being turnable; and a rotation-resisting device mounted on said turnable foot rest member and positioned to contact one of said rear wheels when said latter foot rest member is turned in one direction to exert a braking action on said wheel.

2. A child's vehicle comprising: a frame; having an open V-shaped, horizontally positioned rear portion; a supporting wheel at each side of said open rear portion; a king pin extending vertically through said frame and being rotatable therein; a guide wheel mounted on said pin and acting to support said frame; a steering column inclined rearwardly from said frame; a bent rod extending through said pin in a direction normally in alignment with the axis of said vehicle and through said steering column in a direction normally at right angles to the longitudinal axis of said vehicle; and means for rotatably supporting the upper rear extremity of said steering column.

LA VON I. POWELL.

REFERENCES CITED

The following references are of record in the file of this patent:

UNITED STATES PATENTS

| Number | Name | Date |
| --- | --- | --- |
| D. 163,065 | Powell | Apr. 24, 1951 |
| 1,416,864 | Parkes | May 23, 1922 |
| 1,674,272 | Zander | June 19, 1928 |
| 2,077,274 | Silkman | Apr. 13, 1937 |

FOREIGN PATENTS

| Number | Country | Date |
| --- | --- | --- |
| 3,277 | Great Britain | Oct. 28, 1909 |